United States Patent
Ahrens et al.

(10) Patent No.: US 11,450,900 B2
(45) Date of Patent: Sep. 20, 2022

(54) MODULAR VEHICLE BATTERY WITH REPLACEABLE CELL ELEMENTS

(71) Applicants: Tommy Ahrens, Missouri City, TX (US); Ben Chancey, Cape Coral, FL (US)

(72) Inventors: Tommy Ahrens, Missouri City, TX (US); Ben Chancey, Cape Coral, FL (US)

(*) Notice: Subject to any disclaimer, the term of this patent is extended or adjusted under 35 U.S.C. 154(b) by 464 days.

(21) Appl. No.: 16/730,619

(22) Filed: Dec. 30, 2019

(65) Prior Publication Data
US 2021/0203015 A1 Jul. 1, 2021

(51) Int. Cl.
*H01M 10/46* (2006.01)
*H01M 10/48* (2006.01)
*H01M 10/42* (2006.01)
*H01M 10/44* (2006.01)
*H02J 7/00* (2006.01)

(52) U.S. Cl.
CPC ....... *H01M 10/482* (2013.01); *H01M 10/425* (2013.01); *H01M 10/441* (2013.01); *H02J 7/007* (2013.01); *H02J 7/0047* (2013.01); *H01M 2010/4271* (2013.01); *H01M 2220/20* (2013.01)

(58) Field of Classification Search
CPC .. H02J 7/0047; H02J 7/007; H02J 7/14; H02J 7/0042; H01M 50/204; H01M 10/488; H01M 2220/20; H01M 10/482; H01M 10/425; H01M 10/441; H01M 2010/4271; B60L 50/66; B60L 50/64
USPC ......... 320/107, 110, 116, 117, 132, 148, 112
See application file for complete search history.

(56) References Cited

U.S. PATENT DOCUMENTS

2019/0103639 A1* 4/2019 Guglielmo ............ H01M 50/20
2020/0014004 A1* 1/2020 Bende ................. H01M 50/249
2020/0014008 A1* 1/2020 Bende ................. H01M 50/271

FOREIGN PATENT DOCUMENTS

CN 107492605 B * 9/2020 ............ H01M 50/20
WO WO-2015134884 A1 * 9/2015 ............ H02J 7/0045

* cited by examiner

*Primary Examiner* — Edward Tso (57) ABSTRACT

An electrical energy storage device that includes an enclosure with both a positive electrical connection and a negative electrical connection positioned on an outside surface of the enclosure and a chemical storage cell for storing electrical energy, where the cell is mounted within the enclosure, and where the cell provides electrical energy to loads electrically connected to the connections, and where the cell is removable from the enclosure without uninstalling the device. The device also includes a subframe, attached within the enclosure, for mechanically mounting the cell within the enclosure, a latchable cover attached to the enclosure, where opening the cover enables a user to access the cell, and an electrical harness for electrically connecting the cell to the connections.

15 Claims, 10 Drawing Sheets

MODULAR VEHICLE BATTERY WITH REPLACEABLE CELL ELEMENTS

CROSS-REFERENCES TO RELATED APPLICATIONS

Not applicable.

STATEMENT REGARDING FEDERALLY-SPONSORED RESEARCH OR DEVELOPMENT

Not applicable.

TECHNICAL FIELD

The present invention relates generally to a device, system, and method in the field of energy storage technology. More particularly, the present invention relates to a device, system, and method for electrical energy storage for a vehicle with replaceable cell elements.

BACKGROUND

An automotive battery is a rechargeable battery that supplies electrical current to a motor vehicle. Its main purpose is to feed the starter, which starts the engine. Once the engine is running, power for the car's electrical systems is supplied by the alternator.

The lithium iron phosphate battery ($LiFePo_4$ battery) or LFP battery (lithium ferro-phosphate), is a type of rechargeable battery, specifically a lithium-ion battery, using $LiFePo_4$ as the cathode material, and a graphitic carbon electrode with a metallic backing as the anode. The specific capacity of $LiFePo_4$ is higher than that of the related lithium cobalt oxide ($LiCoO2$) chemistry, but its energy density is less due to its lower operating voltage. The main drawback of $LiFePo_4$ is its low electrical conductivity. Therefore, all the $LiFePo_4$ cathodes under consideration are actually $LiFePo_4$/C. Because of low cost, low toxicity, well-defined performance, long-term stability, and the like, $LiFePo_4$ batteries are finding a number of roles in vehicle use, utility-scale stationary applications, and backup power.

Current technology batteries installed in motive power applications are heavy, costly, and difficult to repair. Often, a modern automobile battery is made of six individual cells, with each cell contributing approximately 2.3 volts to the battery. Therefore, a battery with six cells wired in series generates approximately 13.6 volts when fully charged. When one of the cells fails or becomes fatigued through use, the overall voltage level of the battery drops as well, rendering the entire battery disabled, thus requiring replacement. Often, batteries fail suddenly without warning, creating a condition where a motorist is stranded, and with no immediate assistance available. In addition, battery replacement is arduous work requiring the skills of a mechanic to replace.

Over the last decade, another issue with conventional batteries has developed. Modern vehicles require constant battery power when the engine is off to maintain memory in radios, cell phones, automobile processors, GPS receivers, vehicle tracking systems, and the like. It has become evident that convention lead acid batteries fail within 3-4 years under such conditions. What is needed is a vehicle battery that can continue to supply starting power even with a failed cell, and with the ability to be repairable without removing the entire battery from the vehicle.

SUMMARY

The illustrative embodiments provide a device, system, and method. An embodiment includes an electrical energy storage device that includes an enclosure with both a positive electrical connection and a negative electrical connection positioned on an outside surface of the enclosure and a chemical storage cell for storing electrical energy, where the cell is mounted within the enclosure, and where the cell provides electrical energy to loads electrically connected to the connections, and where the cell is removable from the enclosure without uninstalling the device. The device also includes a subframe, attached within the enclosure, for mechanically mounting the cell within the enclosure, a latchable cover attached to the enclosure, where opening the cover enables a user to access the cell, and an electrical harness for electrically connecting the cell to the connections.

An embodiment includes a vehicle battery system. The system includes an electrical energy storage device made of an enclosure with both a positive electrical connection and a negative electrical connection on an outside surface of the enclosure, a chemical storage cell for storing electrical energy, where the cell is mounted within the enclosure, and where the cell provides electrical energy to loads electrically connected to the connections, and where the cell is removable from the enclosure without uninstalling the device from the vehicle, and a subframe, fixably attached within the enclosure, for mechanically mounting the cell within the enclosure. The device also includes a latchable cover attached to the enclosure, where opening the cover enables a user to access the cell, and an electrical harness for electrically connecting the cell to the positive electrical connection and the negative electrical connection. The system also includes a status monitor, where the status monitor displays the current electrical charge of the device, and a voltage regulator, where the voltage regulator maintains a voltage level and a current level to the device when the device is charging/discharging.

An embodiment includes a method. The method for supplying electrical energy to a vehicle includes supplying, by a storage device mounted in the vehicle, electrical energy to the vehicle, where the storage device includes a plurality of chemical storage cells, detecting a fault condition in the storage device, where the fault condition is caused by one of the cells, and replacing, by a user, the cell causing the fault condition, where the storage device remains mounted in the vehicle during the replacement, and where the cell is removed from the device without disrupting the flow of electrical energy from the remaining cells to the vehicle.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be positioned between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure may be better understood, and its numerous features and advantages made apparent to those skilled in the art by referencing the accompanying drawings. The use of the same reference symbols in different drawings indicates similar or identical items.

FIGS. 1-8 illustrate devices, systems, and methods for an electrical energy storage device for use in a vehicle, with several features that are novel and unique. According to some embodiments, the storage device (battery or device) are used to start a vehicle and to power accessories of the vehicle when the engine is turned off. Other embodiments are possible and are not limited by the examples discussed in this disclosure.

In some embodiments, certain aspects of the techniques described above may implemented by one or more processors executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

Figure 1:
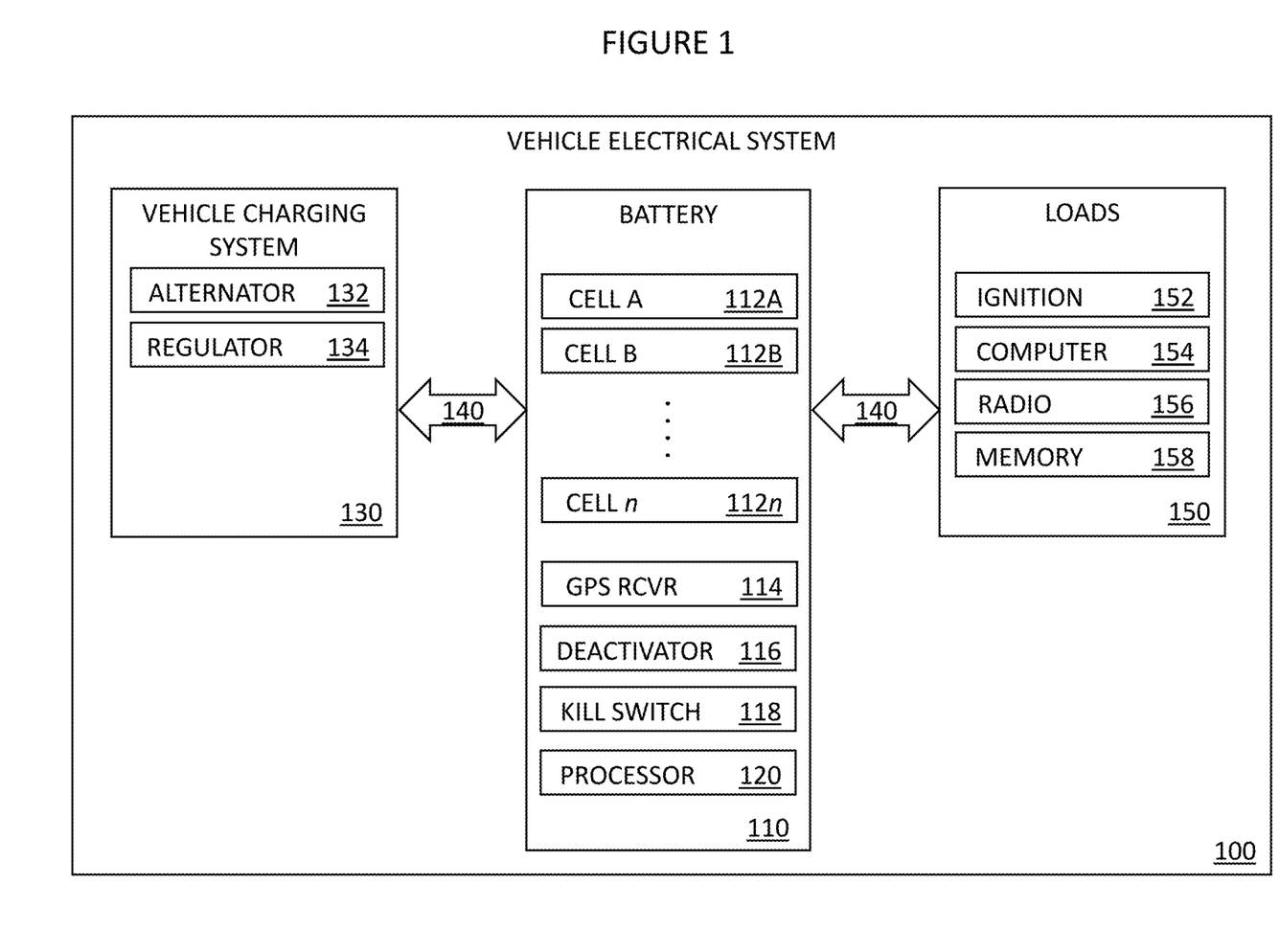
FIG. 1 depicts a block diagram of a vehicle electrical system that includes a battery with removable cells in accordance with an illustrative embodiment.

FIG. 1 depicts a block diagram of a vehicle electrical system 100 that includes a battery 110, mounted within a vehicle, with removable cells in accordance with an illustrative embodiment. Vehicle electrical system 100 also includes a vehicle charging system 130 and various electrical loads 150 (loads) found throughout the vehicle. The vehicle electrical system 100 also includes electrical connections 140 for delivering power to and from the battery 110, the vehicle charging system 130, and the vehicle loads 150. According to some embodiments, the vehicle charging system 130 includes an alternator 132 or generator for generating electrical power when the vehicle engine is running. In some embodiments, braking energy from vehicle motion is used to generate electrical power as well. When the alternator 132 is operating, the electrical energy travels across the electrical connections 140 to the battery 110 and the loads 150. The electrical energy thus charges the battery 110 during normal engine operation. In addition, the various loads 150 of the vehicle also use electrical power generated by the alternator 132 during normal operation. The vehicle charging system 130 also includes a voltage regulator 134 (regulator) for smoothing out the variations in voltage and current output of the alternator 132 during all phases of operation, including when the vehicle is at idle, moving at freeway speeds, or when the accessories are used with the engine off.

According to some embodiments, the regulator 134 is a stand-alone component that is mechanically isolated from other elements of the vehicle electrical system 100. In some embodiments, the regulator 134 can be physically integrated with the regulator 134, thus requiring maintenance on the alternator 132 to repair the regulator 134. In other embodiments, the regulator 134 is integrated with the battery 110. Other locations and placement of the regulator 134 is possible and is not limited by the examples disclosed herein.

Continuing with FIG. 1, the electrical loads 150 of the vehicle can include, but are not limited to the vehicle ignition system 152, the vehicle processors 154 (computers), and entertainment systems such as a radio 156 or DVD players. Furthermore, due to the great number of computers 154 onboard, the vehicle must supply a constant current to maintain memory 158 for each computer 154 in order to maintain data stored in memory 158 such as personalized seat positions, GPS location data, cell phone coverage, wireless-fidelity hotspots, throttle position set points, radio station presets, and the like. Other loads are likely and are not limited by these examples.

The battery 110 is connected to the vehicle charging system 130 and the vehicle loads 150 through the electrical connections 140. According to some embodiments, the electrical connections 140 are made of a positive and a negative power bus. According to other embodiments, one bus uses the metal chassis of the vehicle itself for conductivity, thus reducing the cost and engineering require running two dedicated power busses throughout the vehicle. In many modern vehicles, the negative bus is connected to the vehicle chassis, thus making the vehicle chassis the "common" or "ground" for the vehicle electrical system.

The battery 110 is made of a number of elements, including one or more power cells 112A-112n (cells). Any number of power cells 112 can be located within a battery 110 and the number of cells 112 in a battery 110 is limited only by size constraints, vehicle charging capacity, load requirements, and the like. According to some embodiments, the cells 112 are connected serially, thus creating a battery 110 voltage that is additive. In other embodiments, the cells 112 are connected in parallel, thus providing the same voltage as a single cell 112 but with a larger current capacity. In yet other embodiments, the cells 112 can be wired in series-parallel, thus providing a wide range of voltages and current capacities for most any situation. Other embodiments are possible and are not limited by the example disclosed herein. In operation, the battery 110 is used to start a vehicle. Once is vehicle is started, the battery 110 is recharged by the vehicle charging system 130.

According to some embodiments, the battery also includes tracking circuit, such as a global positioning system (GPS) receiver/tracker 114 which works by receiving signals from overhead satellites, calculates the battery's 110 position, and thus the vehicle's position. Once the vehicle location is determined, the GPS receiver 114 sends location data to a remote authority, including but not limited to a finance company, a parent tracking the location of a vehicle driven by a child, and the like. Other tracking technologies are possible, such as using cell tower geolocation, triangulation of radio signals, and the like. And are not limited by the examples disclosed herein.

According to some embodiments, the battery 110 also includes a deactivation circuit (deactivator) 116. The deactivator 116 renders the battery 110 unable to provide any electrical power to the vehicle. In operation, this circuit can be activated, for example, by a lienholder of the vehicle attempting to repossess the vehicle from a driver behind on their payments. Another example would be a parent that sets the deactivator 116 to prevent starting the vehicle after a set curfew time. According to some embodiments, the deactivator 116 operates to physically disconnect the battery 110 to one or both electrical connections 140 using one or several methods, including but not limited to a solid state switch, a fusible link, a circuit breaker, and the like. In some embodiments, the deactivator 116 can be enabled and disabled using any number of methods, including but not limited to a radio signal, a remote control system, a cell phone, radio waves, and the like.

According to some embodiments, the battery 110 also includes a vehicle kill switch circuit 118 (kill switch). The kill switch 118 operates to immediately disable the vehicle itself when activated. Unlike the deactivator 116 previously described, which deactivates the battery 110 but leaves the vehicle running but unable to be restarted, the kill switch 118 operates to immediately disable the vehicle itself by shunting one of the electrical connections (e.g., the positive bus) within the battery 110 directly to vehicle ground. This action would short out the vehicle charging system 130 in a violent manner, likely permanently disabling vehicle operations such as the engine and power steering. In some embodiments, the shunt transits through a large resistor to drain electrical energy in a safe manner. In operation, the vehicle is stopped from operating when the kill switch 118 is received by an outside authority, such as a law enforcement officer in pursuit of the vehicle. In some embodiments, the kill switch 118 can be enabled and disabled using any number of methods, including but not limited to a radio signal, a remote control system, a cell phone, radio waves, and the like.

Continuing with FIG. 1, in some embodiments, the battery 110 includes a processor and memory 120 (processor). The processor 120 performs many management functions of the battery 110, including but not limited to charging/discharging rate control, receiving and sending parameter data to and from the vehicle, generating status indicators for display on the battery 110 or on the cells 112, communication with a remote authority such as law enforcement or a parent, and the like. In some embodiments, the processor 120 performs self-diagnostic functions for the battery 110 and the elements within, such as the cells 112.

Figure 2:
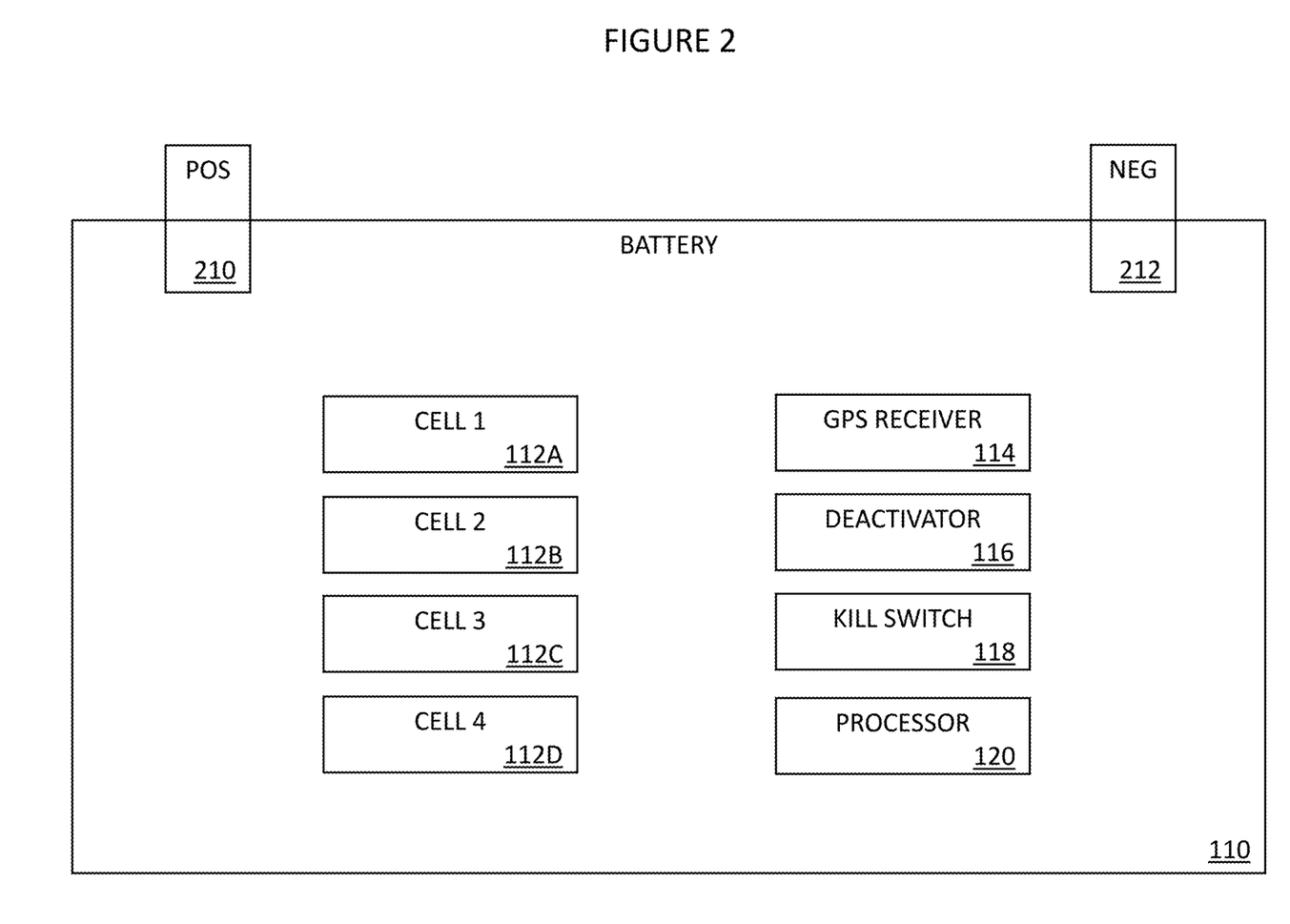
FIG. 2 depicts a block diagram of a battery with removable cells in accordance with an illustrative embodiment.

FIG. 2 depicts a block diagram of a battery 110 with four removable cells 112A-112D in accordance with an illustrative embodiment. The battery 110 can include one or more cells 112 depending on the application and operation requirements as defined by the user. It is to be understood that the battery 110 can contain any number of cells 112, including just a single cell 112, or four, six, eight, or twenty cells 112 or more depending on the user's needs and system requirements. In some embodiments, even a single cell 112 has sufficient energy to start a vehicle engine multiple times. In yet other embodiments, each cell 112 of the plurality of cells 112A-112D present in the battery 110 generates approximately 12 volts and sufficient current to start a vehicle engine by itself. According to some embodiments, a plurality of cells are positioned within the battery 110, with the cells 112A-112D wired together in parallel to provide electrical energy to the vehicle and the maximum possible current, also termed "cold cranking amps" (CCA). According to some embodiments, one or more cells 112A within the battery 110 are held in isolation and are not connected to the other cells 112B-112D to provide power during routine operations. In such situations, the isolated cell 112A continues to generate electrical energy and receive charging power from the vehicle charging system 130, but does not contribute to starting the vehicle or powering accessories unless the user, typically the driver, activated the isolated cell 112A in a deliberate action. In this manner, the driver is assured adequate electrical power to start the vehicle even when the other cells 112B-112D are disables, removed, or otherwise unavailable to perform their stated function. This feature permits a driver to use the vehicle with confidence, knowing that, even with multiple cell 112B-112D failures, at least one cell 112A, held in reserve, is ready and standing by to start the vehicle when the necessity arises.

According to some embodiments, cell 112 includes a chemical that stores electrical energy using LiFePo$_4$ material. Other formulations are possible and are not limited by this example. According to some embodiments, each cell 112 is configured to store and release, and to charge/discharge, electrical energy at approximately 12 volts and supply sufficient current to start a vehicle engine. With each cell 112 able to supply sufficient voltage and current, the presence of additional cells 112 in the battery 110 allows for redundancy and backup capability, as well as increased current capacity when the cells 112 are wired in parallel. Likewise, when the cells 112 are wired in series, higher voltages are possible. Furthermore, as disclosed herein, series-parallel combinations of cells 112 in a battery 110 allows for different voltage/current capabilities, such as 24 volts, 48 volts, and the like. In some embodiments, cells 112 wired in series can be constructed of different chemicals that exhibit different voltage and current levels. As an example, a cell 112 is designed to provide 6 volts of energy, or 9 volts. Many combinations are possible and are not limited by these examples.

Continuing with FIG. 2, the battery 110 also includes two electrical posts, the positive post 210 and the negative post 212. According to some embodiments with a vehicle electrical system using the vehicle chassis as a common ground, the negative post 212 is electrically connected to the vehicle chassis while the positive post 210 is electrically connected to a fuse box, circuit breaker assembly, and the like to provide electrical power to various loads 150 of the vehicle. Each cell 112A-112D is wired to the positive post/negative post 210, 212, respectfully via a wiring harness. The wiring harness, described further below, is wired in series, parallel, or in series-parallel with each cell 112A-112D as desired for a given application.

Figure 3A:
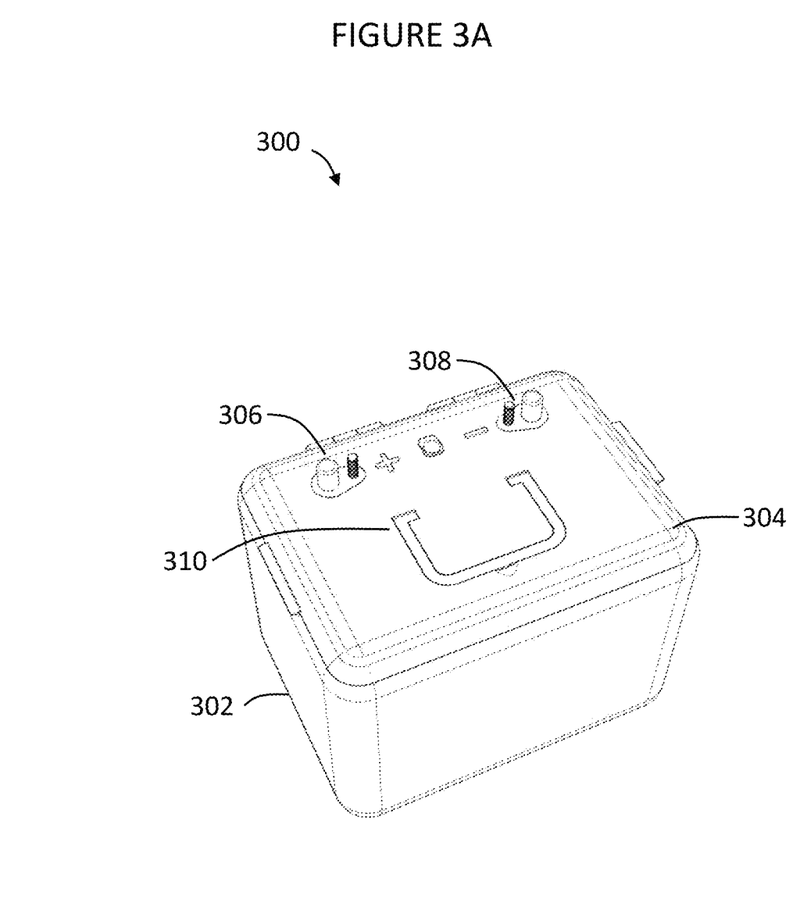
FIGS. 3A, 3B, 3C, and 3D depict isometric views of a battery with a hinged cover in accordance with an illustrative embodiment.
Figure 3B:
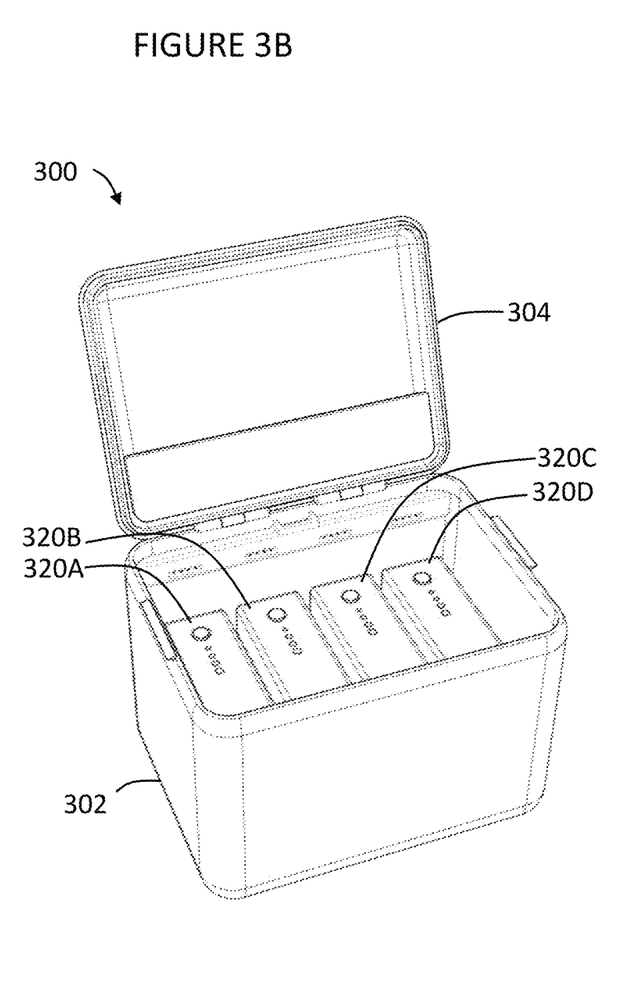
Figure 3C:
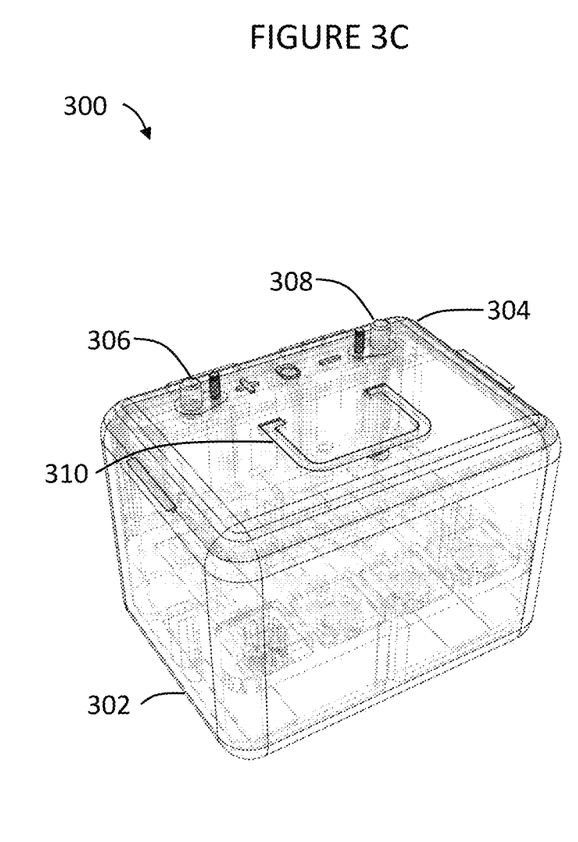
Figure 3D:
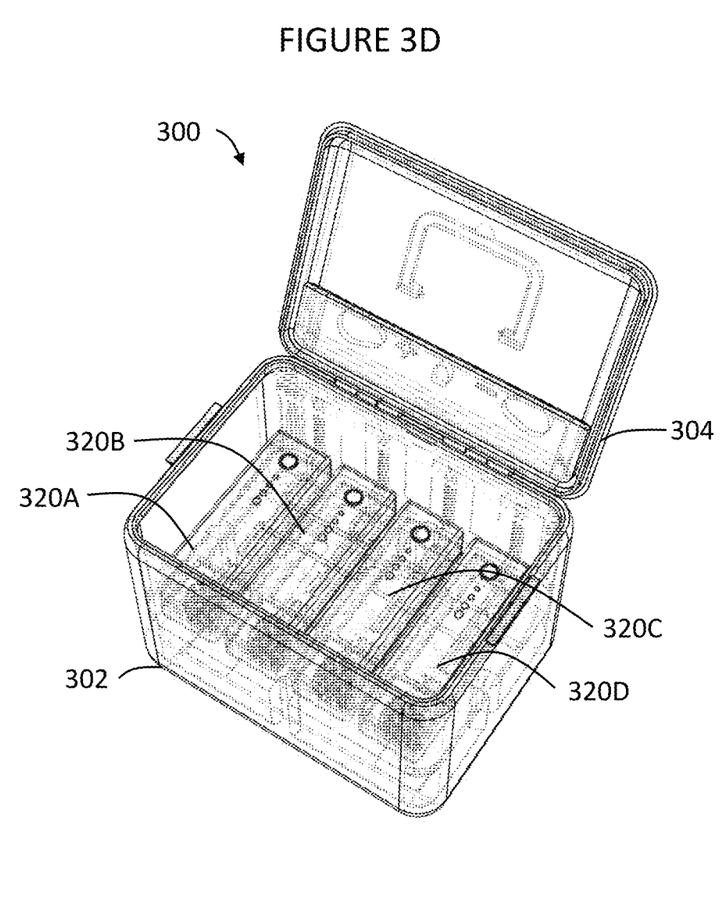

FIGS. 3A, 3B, 3C, and 3D depict isometric views of a battery with a hinged cover (battery assembly) 300 in accordance with an illustrative embodiment. FIGS. 3A and 3B provide a solid-surface isometric view of the battery assembly 300, while FIGS. 3C and 3D provide a see-through isometric view of a battery assembly 300, with all views showing the same single example. It should be understood that the battery assembly 300 is but one embodiment encompassing the ideas disclosed herein. Other embodiments are possible and are not limited by this example. The battery assembly 300 includes an enclosure 302, a hinged cover 304, a positive terminal assembly 306, a negative terminal assembly 308, a handle 310, and a plurality of cell modules 320A-320D. In the present embodiment, battery assembly 300 includes four cell modules 320A-320D, with each cell module 320 capable to starting a vehicle engine by itself. Also in some embodiments, one cell module 320A is held in reserve and isolated from the other cell modules 320B-320D.

According to some embodiments, each cell module 320A-320D includes several status indicators on the top surface to alert a user of the current status of the cell module 320. These indicators include, but are not limited to charge/discharge rate, voltage, health status, fault conditions, and the like. Also in some embodiments, the cell module 320A-320D include a charging port for smaller portable electronic devices, such as a USB port for charging a cell phone. According to some embodiments, the USB port can be used to charge the cell module 320A-320D using commercially-available wall chargers, or even another cell module 320. In some embodiments, each cell module 320A-320D includes a pushbutton or other selection device to allow the user to start a built-in-test procedure (BIT) on the cell module 320A-320D, to check the capacity levels of the cell module 320A-320D, to place the cell module 320A-320D in reserve, and the like. Each cell module 320A-320D is removable from the enclosure 302 without disconnected or unmounting the enclosure 302. Access to the cell modules 320A-320D is via the hinged cover 304, which allows access to the interior of the enclosure 302 while the battery assembly 300 is installed in the vehicle.

Figure 4A:
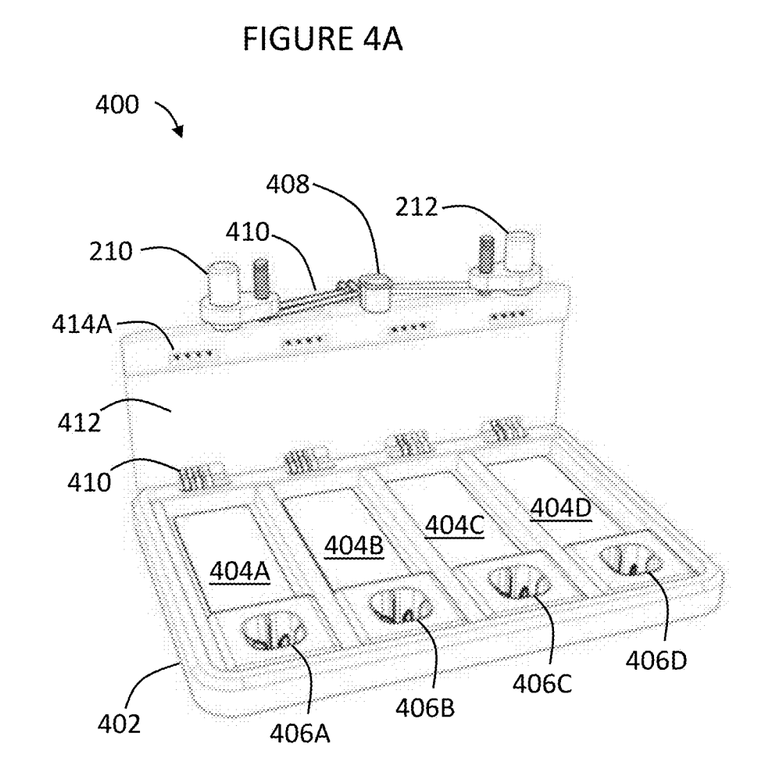
FIGS. 4A and 4B depict isometric views of a battery subframe in accordance with an illustrative embodiment.
Figure 4B:
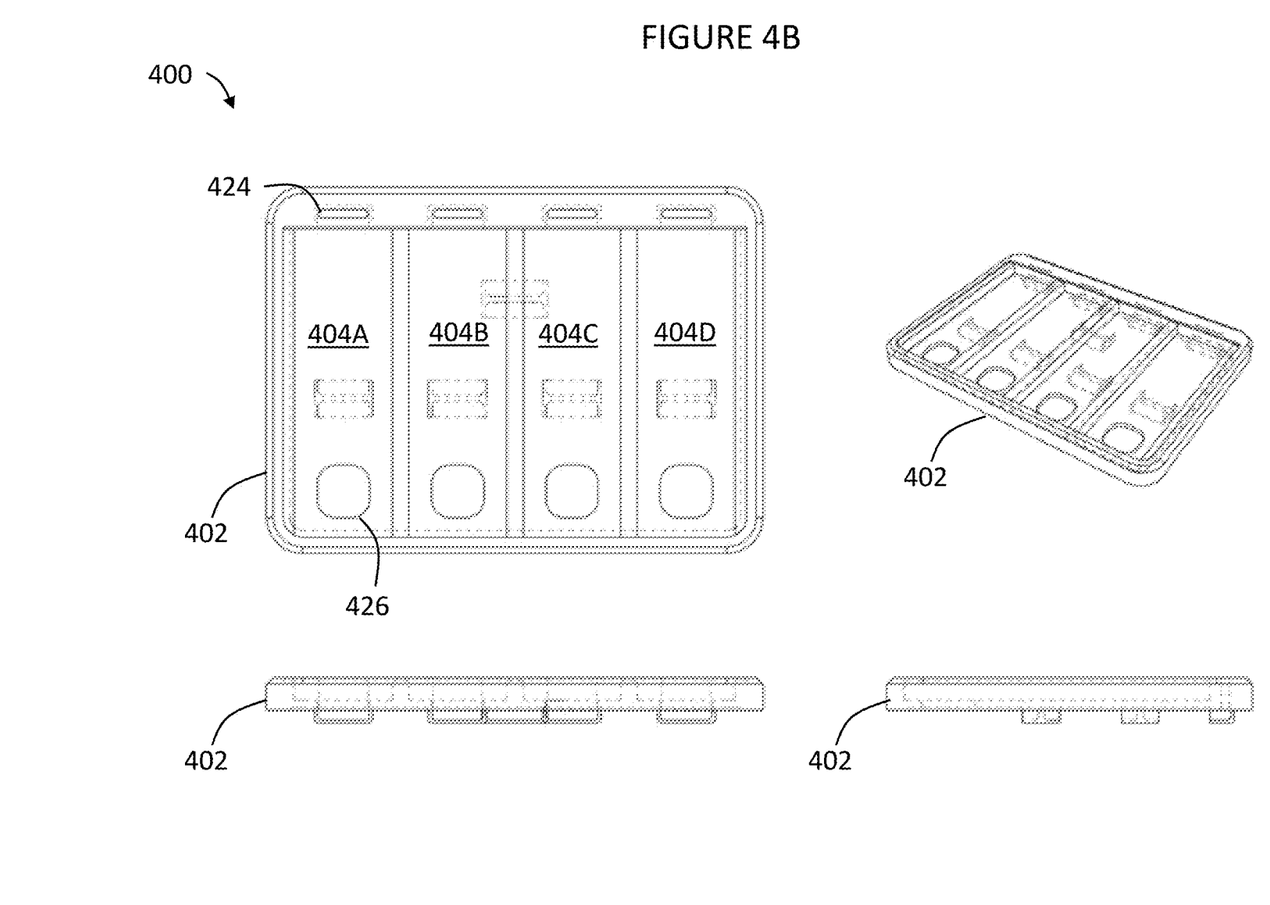

FIGS. 4A and 4B depict isometric views of a battery subframe 400 (subframe) in accordance with an illustrative embodiment. The subframe 400 resides inside the battery assembly 300 and is the mechanical chassis for the battery assembly 300. The subframe 400 mechanically holds each cell module 320 of FIG. 3 securely within the battery assembly 300. In addition, the subframe 400 also includes a wiring harness 410 for electrically connecting each cell module 320 in series or parallel as appropriate to the positive/negative terminals 210, 212 of FIG. 2 respectfully. The subframe 400 also includes a selector 408 for a user to enter configuration choices or to start a BIT procedure within the battery assembly 300 as appropriate. The subframe 400 also includes a sidewall 412, a bottom tray 402, and four position pads 404A-404D, with each position pad 404A-404D configured to mechanically hold a cell module 320A-320D securely in place. The subframe 400 also includes harness cutouts 424 for the wiring harness 410 and connector cutouts 426 for the electrical cell connectors 406A-406D.

The subframe also includes an electrical cell connector 406A-406D for electrically connecting a cell module 320A-320D to the wiring harness 410. The electrical cell connector 406A-406D is configured to mate with a corresponding connector on each of the cell modules 320A-320D. The wiring harness 410 is configured to supply the positive/negative terminals 210, 212 with electrical energy from at least one cell module 320A, even when some or all of the other position pads 404A-404D are vacant. According to some embodiments, the subframe 400 also includes at least one of a GPS receiver 114, the deactivator 116, the kill switch 118, or the processor 120, all of FIG. 1. In some embodiments, pad status indicators 414A-414D are included in the subframe 400 to provide connection and performance status on the corresponding cell module 320A-320D installed in that position pad 404A-404D.

Figure 5A:
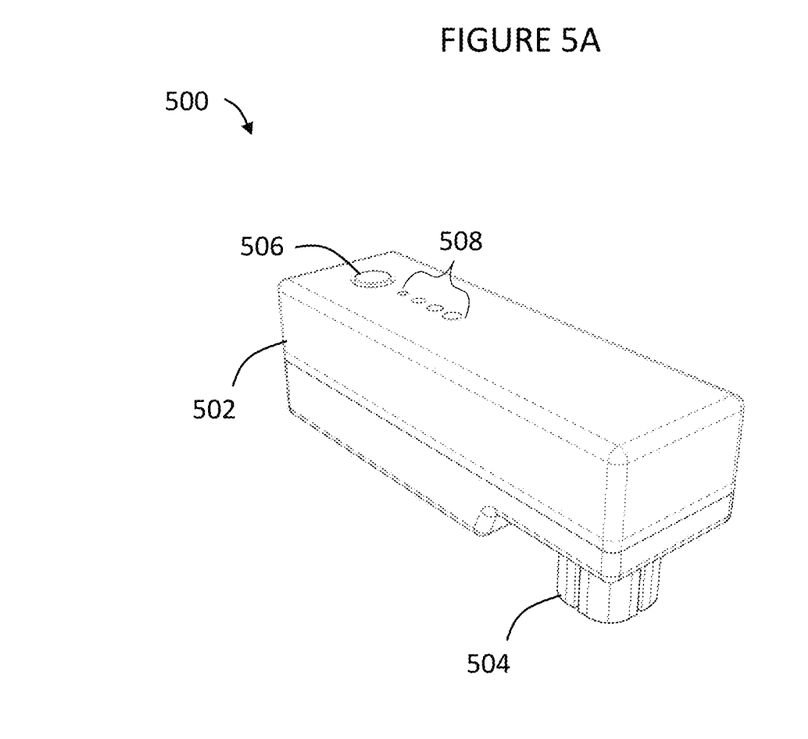
FIGS. 5A and 5B depict isometric views of an individual modular battery cell in accordance with an illustrative embodiment.
Figure 5B:
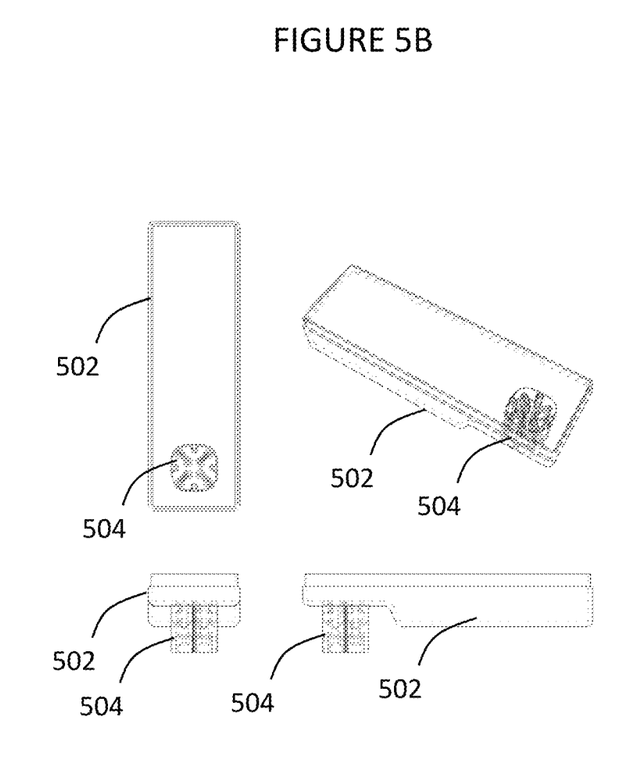

FIGS. 5A and 5B depict isometric views of an individual modular battery cell 500 in accordance with an illustrative embodiment. Modular battery cell 500 is but one example of cell 112 of FIG. 1 disclosed earlier. In some embodiments, modular battery cell 500 is exemplified by cell module 320 of FIG. 3. In the present embodiment, modular battery cell 500 includes a case body 502 to contain the chemical material inside that stores and releases electrical energy. The modular battery cell 500 also includes a cell connector 504 to establish electrical conductivity with the subframe 400 through the corresponding electrical cell connector 406. A cell selector button 506 is used to enter data and to start a BIT sequence. In some embodiments, the modular battery cell 500 also includes one or more status indicators 508, as disclosed earlier.

In operation, the modular battery cell 500 is mechanically and electrically connected to the subframe 400 of the battery assembly 300. Each individual modular battery cell 500 is capable of starting a vehicle engine as described herein. The presence of additional modular battery cells 500 in a battery assembly 300 aids in redundancy and reliability, and can contribute to providing additional voltage levels/CCA amounts as described herein. When an individual modular battery cell 500 is disabled, broken, discharged, used to another application, and the like, the modular battery cell 00 can be removed from the battery assembly 300 without affecting the other modular battery cells 500 in the battery assembly 300. According to some embodiments, each modular battery cell 500 includes an inherent BIT system for self-diagnosis and status determination. According to some embodiments, at least one modular battery cell 500 is electrically isolated form the other modular battery cells 500 present to provide a redundancy capability for the battery assembly 300.

Figure 6:
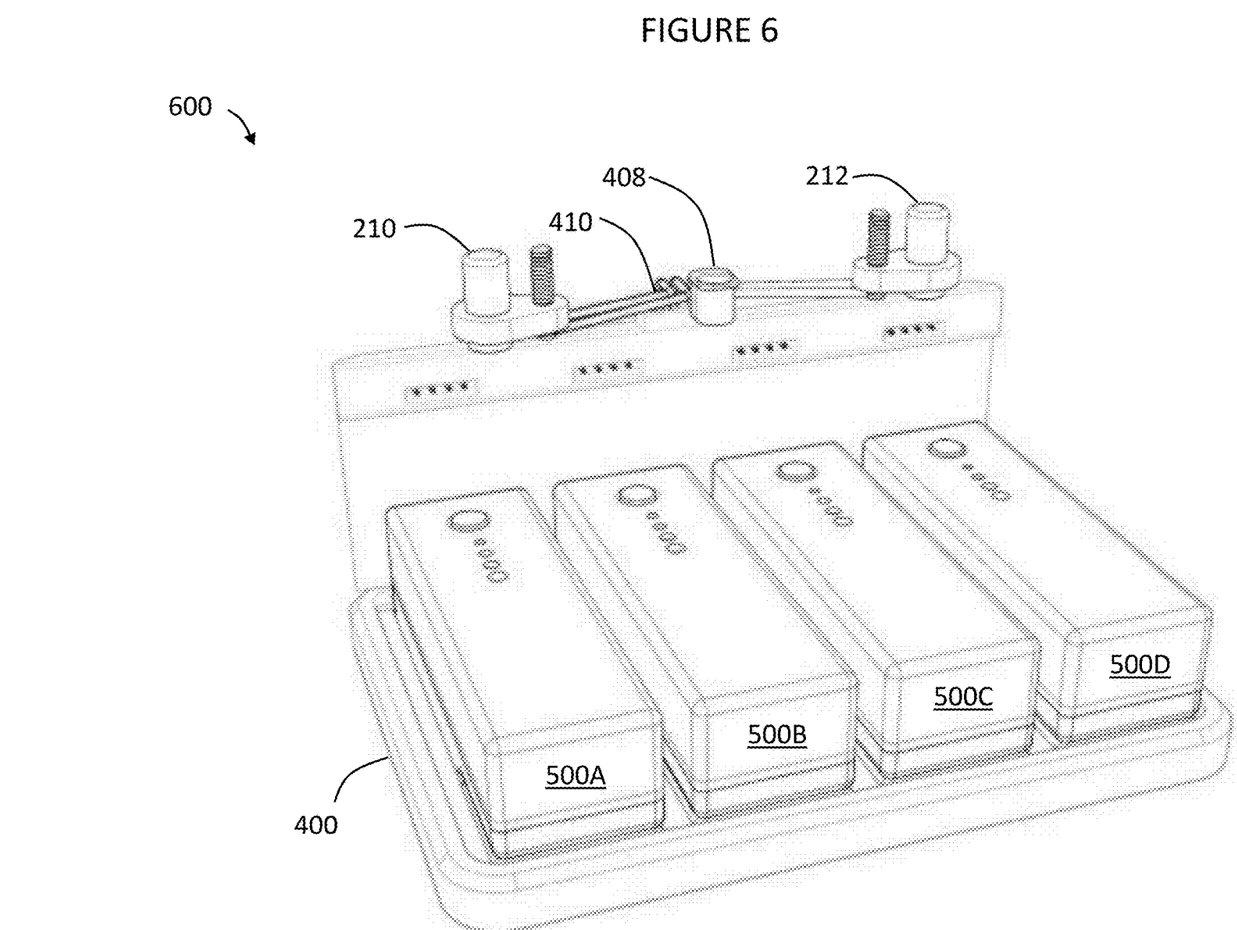
FIG. 6 depicts a an isometric view of multiple battery cells installed onto a battery subframe in accordance with an illustrative embodiment.

FIG. 6 depicts a an isometric view of multiple modular battery cells 500A-500D installed onto a battery subframe 400 in accordance with an illustrative embodiment. As disclosed earlier, one or more modular battery cells 500A-500D can be removed from the subframe while still allowing the battery assembly 300 to start a vehicle engine.

Figure 7:
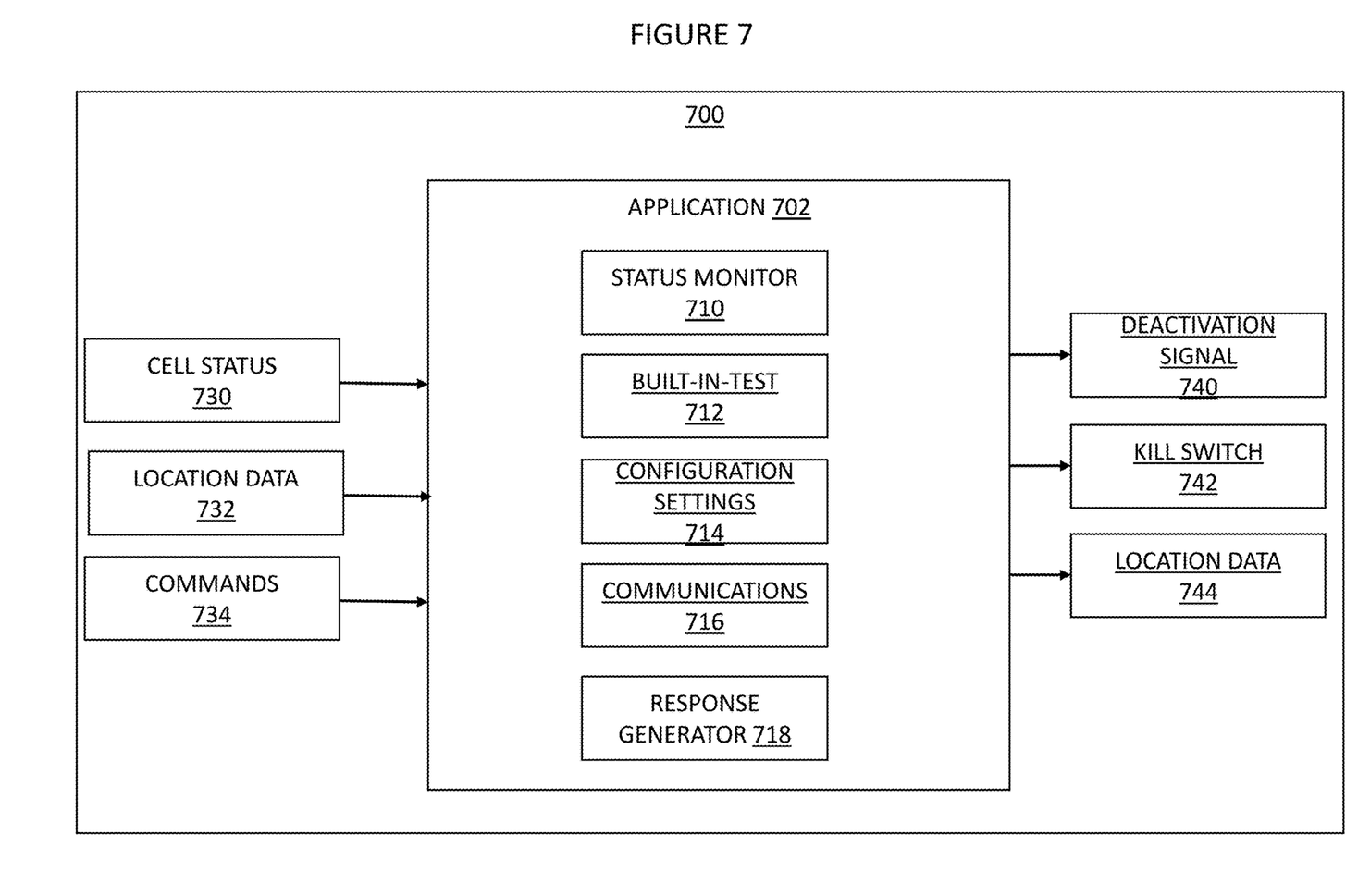
FIG. 7 depicts a functional diagram of an example application for battery management and control in accordance with an illustrative embodiment.

FIG. 7 depicts a functional diagram of an example application program 700 for battery management and control in accordance with an illustrative embodiment. According to some embodiments, the battery assembly 300 includes a processor 120 (of FIG. 1) for performing self-tests, BIT tests, operating a GPS receiver tracker such as GPS receiver 114 of FIG. 1, and the like. The application program 700 includes any of several application modules 702 to include, but not limited to a status monitor module 710, a built-in-test module 712, a configuration settings storage module 714, a communications module 716 for communicating with remote users via a network or radio system as disclosed herein, and a response generator 718 for sending status signals and alerts to the vehicle processor for further action.

The application modules 702 accept as inputs any of a number of signals, including but not limited to module battery cell status signals 730, location data 732, such as location data received form the GPS receiver 114, and command signals 734 from the vehicle user or a remote user, as appropriate. The application modules also generate output signals to the vehicle, the vehicle user, or remote users as necessary. These output signals include, but are not limited to a deactivation signal 740 in response to receiving a command signal 734, a kill switch activation signal 742, or location data 744. Other embodiments are possible and are not limited by these examples.

Figure 8:
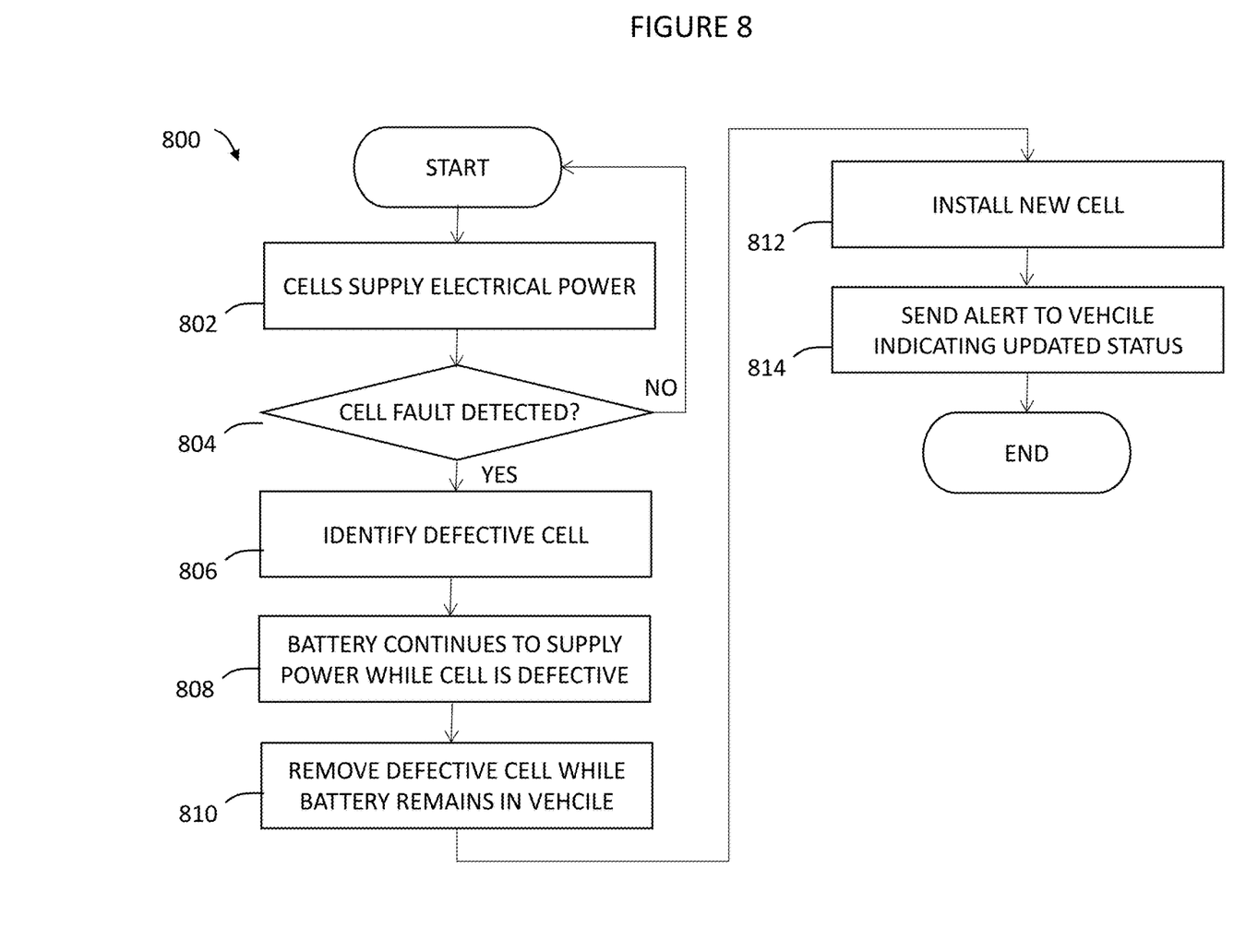
FIG. 8 depicts a flowchart of an example battery management and control system in accordance with an illustrative embodiment.

FIG. 8 depicts a flowchart 800 of a battery management and control system in accordance with an illustrative embodiment. Flowchart 800 begins at block 802, where a battery, such as battery assembly 300, containing one or more cells, such as modular battery cells 500, stores and releases electrical energy to a vehicle. Next, at block 804, diagnostics or a BIT application checks whether one of the modular battery cells 500 is defective. If no fault is detected, the process returns to block 802. If a fault with a modular battery cell 500 is detected, the process continues to block 806, where the application identifies which modular battery cell 500 is defective. According to some embodiments, the identification can be by a light or LED indicator on the battery assembly 300, or on the modular battery cell 500 itself. Next, at block 808, the battery assembly 300 continues to charge/discharge sending electrical energy to the vehicle as needed while the defective modular battery cell 500 is still connected to the battery assembly 300. Next, at block 810, a user opens the hinged cover 304 of the battery assembly 300, identifies the defective modular battery cell 500, and removes the defective unit from the battery assembly 300 without uninstalling the battery assembly 300 itself from the vehicle. Next, at block 812, the user installs a new modular battery cell 500 into the battery assembly 300. Finally, the process 800 ends at block 814 where the battery assembly 300 updates its status by sending a status alert signal to the vehicle indicating the absence of any faults.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure includes all such modifications and alterations and is limited only by the scope of the following claims. In particular regard to the various functions performed by the above described components the terms used to describe such components are intended to correspond, unless otherwise indicated, to any component which performs the specified function of the described component (for example, a term that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An electrical energy storage device, comprising:
   an enclosure with both a positive electrical connection and a negative electrical connection positioned on an outside surface of the enclosure;
   a chemical storage cell for storing electrical energy, wherein the cell is mounted within the enclosure, and wherein the cell provides electrical energy to loads electrically connected to the positive electrical connection and the negative electrical connection, and wherein the cell is removable from the enclosure without uninstalling the device;
   a subframe, fixably attached within the enclosure, for mechanically mounting the cell within the enclosure;
   a latchable cover attached to the enclosure, wherein opening the cover enables a user to access the cell;
   an electrical harness for electrically connecting the cell to the positive electrical connection and the negative electrical connection; and
   a processor and memory, wherein the processor executes an application stored in the memory that manages cell charging/discharging.

2. The device of claim 1, further comprising an interrupt circuit to prevent current to flow from the device responsive to receiving a signal from a remote user.

3. The device of claim 1, further comprising a shunt circuit to deactivate the, device responsive to receiving a signal from a remote user, wherein the shunt circuit directs device current to a ground.

4. The device of claim 1, further comprising a global positioning system (GPS) tracker installed in the device, wherein the GPS tracker reports a device location to a remote authority.

5. The device of claim 1, wherein the presence of one cell in the device is sufficient to provide electrical energy to start a vehicle.

6. The device of claim 1, further comprising a plurality of cells mounted in the device, wherein one cell is electrically isolated from the remaining cells and held in reserve to start a vehicle when the remaining cells are unavailable.

7. A vehicle, battery system, comprising:
   an electrical energy storage device comprising:
      an enclosure with both a positive electrical connection and a negative electrical connection on an outside surface of the enclosure;
      a chemical storage cell for storing electrical energy, wherein the cell is mounted within the enclosure, and wherein the cell provides electrical energy to loads electrically connected to the positive electrical connection and a negative electrical connection, and wherein the, cell is removable from the enclosure without uninstalling the device from the vehicle;
      a subframe, fixably attached within the enclosure, for mechanically mounting the cell within the enclosure;
      a latchable cover attached to the enclosure, wherein opening the cover enables a user to access the cell; and
      an electrical harness for electrically connecting the cell to the positive electrical connection and the negative electrical connection;
   a status monitor, wherein the status monitor displays the current electrical charge of the device;

a voltage regulator, wherein the voltage regulator maintains a voltage level and a current level to the device when the device is charging/discharging: and a processor and memory, wherein the processor executes an application stored in the memory that manages cell charging/discharging.

8. The system of claim 7, further comprising a plurality of cells mounted in the device, wherein one cell is electrically isolated from the remaining cells and held in reserve to start the vehicle when the remaining cells are unavailable.

9. The system of claim 7, further comprising an interrupt circuit to prevent current to flow from the device responsive to a signal from a remote user.

10. The system of claim 7, further comprising a shunt circuit to deactivate the device responsive to a signal from a remote user, wherein the shunt circuit directs device current to a ground, and wherein the vehicle battery system is shorted to the ground.

11. A method for supplying electrical energy to a vehicle, comprising:

supplying, by a storage device mounted in the vehicle, electrical energy to the vehicle, wherein the storage device includes a plurality of chemical storage cells;

detecting a fault condition in the storage device, wherein the fault condition is caused by one of the cells;

replacing, by a user, the cell causing the fault condition, wherein the storage device remains mounted in the vehicle during the replacement, and wherein the cell is removed from the device without disrupting the flow of electrical energy from the remaining cells to the vehicle; and executing, by a processor and memory, an application stored in the memory that manages cell charging/discharging.

12. The method of claim 11, further comprising isolating one cell of a plurality of cells mounted in the device, wherein the cell is held in reserve to start a vehicle when the remaining cells are unavailable.

13. The method of claim 12, further comprising interrupting current flowing from the device to the vehicle in response to receiving a signal from a remote user to prevent starting of the vehicle.

14. The method of claim 12, further comprising shunting the device current to a vehicle ground in response to receiving a signal from a remote user to halt present operation of the vehicle.

15. The method of claim 12, further comprising transmitting position data to a remote user using a global positioning system (GPS) tracker installed in the device.

* * * * *